3,456,258
RADAR SYSTEM UTILIZING A TARGET DISPLAY RESEMBLING A THREE-DIMENSIONAL RELIEF PICTURE

Dennis William George Byatt and Alfred Benjamin Starks-Field, Essex, England, assignors to The Marconi Company, Limited, London, England, a British company
Filed July 23, 1968, Ser. No. 746,976
Claims priority, application Great Britain, July 25, 1967, 34,081/67
Int. Cl. G01s 7/20
U.S. Cl. 343—7.9          10 Claims

ABSTRACT OF THE DISCLOSURE

In a radar having a cathode ray display system of the P.P.I. type in which angular movement of an echo-signal displaying cathode ray beam about the display origin is obtained by two angularly related components of deflection applied to said ray, an auxiliary signal derived from the echo signal is superimposed on at least one of the components. The target display thus resembles a three-dimensional relief picture.

---

Figure 1:
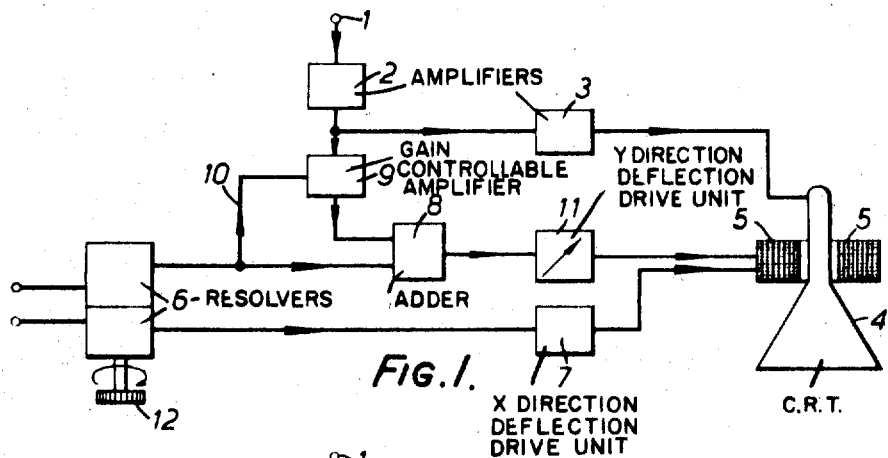

This invention relates to radars and has for its object to provide improved radars employing cathode ray tube display systems of the P.P.I. type which shall be such that desired targets shall be more prominently and clearly displayed than they are by comparable known radars having display systems of the type in question and as at present in common use.

By the expression "cathode ray tube display system of the P.P.I. type" as employed in specification, is meant a display system wherein a cathode ray which is controlled in intensity by received echo signals is caused to swing round (normally to rotate continuously about) the origin of the display in correspondence with the changing momentary direction (normally continuous rotation in azimuth) of the directionally transmitted radar beam so that, in any time, the angular direction of the cathode ray "spot" in relation to the display origin, corresponds with the direction in which said beam is transmitted at that time.

An important cause of limitation of the performance of known radars having cathode ray tube display systems of the P.P.I. type and as at present in common use, is the restricted dynamic range of the phosphor of the light-emitting display screen of the display cathode ray tube. It is usual in the display tubes of such radars to use a phosphor with relatively long afterglow. The use of such a phosphor has the advantage of retaining past information i.e., to continue to glow for an appreciable time after a signal which initiated the glow has ceased. As is well known, targets displayed by a tube with good afterglow will exhibit visible afterglow "tails" and these are most useful, in reasonably good operating conditions, to a human operator with display pattern recognition ability, enabling him, in such operating conditions, more readily to distinguish desired targets (e.g., of aircraft or ships) from displayed light spots due to spurious or interfering signals and to make rough estimates of desired target speeds and directions of movement from the lengths and directions of the "tails." However in adverse circumstances such as when receiving echoes from aircraft in cloud or (in the case of a marine radar) from small ships in severe weather, the limited dynamic range of the phosphor makes the clear establishment of wanted target tracks or tails difficult if not impossible and targets become very difficult to recognise and distinguish. The present invention seeks to overcome this difficulty and this object is achieved by providing a display in which (as will be seen later) desired targets appear in a manner resembling a relief or three dimensional picture.

According to this invention in its broadest aspect a radar having a cathode ray display system of the P.P.I. type wherein angular movement of an echo-signal displaying cathode ray beam about the display origin is obtained by two angularly related components of deflection applied to said ray, comprises means for superimposing upon at least one of said components an auxiliary signal which is constituted by or derived from the echo signals, whereby desired targets are displayed in a manner resembling that of a three-dimensional or relief picture.

Preferably said superimposed auxiliary signal is of a magnitude which is varied in dependence upon the varying magnitude of one of said angularly related components. However it is quite practical, in carrying out the invention, to superimpose echo signals directly on one of the components of deflection.

According to a feature of this invention a radar having a cathode ray display system of the P.P.I. type wherein angular movement of an echo-signal displaying cathode ray beam about the display origin is obtained by two angularly related components of deflection applied to said ray, comprises means for superimposing upon at least one of said components an auxiliary signal which is derived from the echo signals and is of a magnitude which is varied in dependence upon the varying magnitude of the component on which it is superimposed whereby desired targets are displayed in a manner resembling that of a three-dimensional PR relief picture.

In normal and preferred practice the two angularly related components of deflection are mutually perpendicular. They may be of equal magnitudes but some subjective advantage is obtainable by making them of different magnitudes and means may be, if desired, provided for adjusting their relative magnitude.

One form of radar in accordance with the invention includes means for deriving, in corresponding with the changing direction of the transmitted radar beam, two deflection control signals dependent respectively upon the sine and cosine of the angle between said direction and a datum direction; a gain controllable amplifier to which video signals derived from the radar receiver are fed; means for controlling the gain of said amplifier by one of said deflection control signals; and means for superimposing gain controlled auxiliary signals derived from said amplifier on said one deflection control signal.

If desired signals employed for controlling the intensity of the cathode ray beam in the display tube may be derived from received echo signals by means including an amplifier which is controlled in gain by the aforesaid one of the two deflection control signals.

Means known per se may be provided for at will manually rotating the display produced by the cathode ray tube. This may be effected in any convenient known way, e.g., by rotating the rotor of a resolver provided for resolving change of transmitted radar beam direction into components or by equivalent control of an equivalent resolving arrangement, e.g., a time base resolver or an aerial shaft position encoder as known per se.

The superimposition of the auxiliary signals may be effected at any convenient space in the display system. Thus for example, where the display tube has electromagnetic deflecting coils which are capable of responding adequately to the video frequency of the auxiliary signals the superimposition may be effected at the appropriate coil itself; or it may be effected by means of an auxiliary deflecting coil; or it may be effected at any stage in a deflecting signal channel leading to the deflection system of the display tube.

Figure 2:
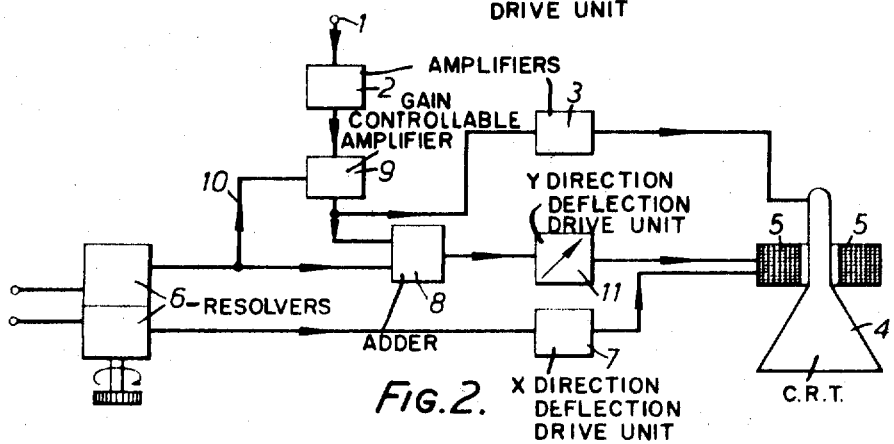
Figure 3:
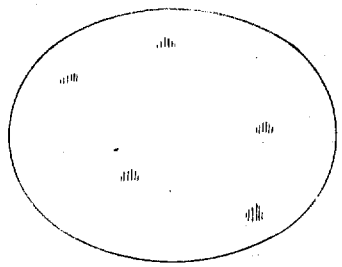

The invention is illustrated in and further explained in connection with the accompanying drawing in which FIGURES 1 and 2 are simplified block diagrams and FIGURE 3 is a schematic representation showing, with reasonable approximation, the nature of a display obtainable when using this invention.

Referring to FIGURE 1 video signals, derived in the customary way from the radar receiver (not shown) appear at terminal 1 and are supplied via suitable amplifiers 2 and 3 as "brighten up" signals to the gun system of a cathode ray display tube 4 having a phosphor screen of long afterglow. The tube has electromagnetic deflection in co-ordinate directions effected by the usual coil system represented diagrammatically at 5. A voltage obtained by any known means (not shown) so as to be representative of rotation of the radar aerial (also not shown) is applied to a known resolver 6 which produces therefrom output deflecting voltage components respectively representative of the sine and cosine (X and Y) components of aerial rotation. The X component is fed to an X direction deflecting coil drive unit 7 and thence to the X windings in the coil system 5. The Y component is fed to an adder unit 8 which receives as its second input an auxiliary video signal from a gain controllable amplifier 9 the gain of which is controlled by the Y component from the resolver 6 as indicated by the gain controlling lead 10. The amplifier 9 receives video input from the amplifier 2. The Y deflection component, with the auxiliary signal superimposed thereon, appears at the output of the adder 8 and is fed to a Y direction deflecting coil drive unit 11 driving the Y windings at 5.

The X and Y components appearing as output from the resolver 6 are equal and thus equality may be retained. If this is done the P.P.I. display will be of the customary circular boundary shape. However it may be subjectively advantageous to depart from this equality and make the X and Y components unequal—preferably adjustably unequal. This is indicated in FIGURE 1 by the arrow on the block 11 indicating that the gain of this drive unit is adjustable. It may also be subjectively advantageous to rotate the whole display to some position of rotation in which the targets appear most clearly. This may be done, in the arrangement of FIGURE 1 by rotating the handle 12 which rotates the rotor (not separately shown) of the resolver 6.

The modification shown in FIGURE 2, in which the same references denote the same parts as in FIGURE 1, differs from that of FIGURE 1 only in that the brighten-up signals fed to the gun system of the display tube 4 are derived from the output of the gain controlled amplifier 9 so that they are also subjected to gain control by the Y component from the resolver 6. This has the advantage of enhancing the brightness of the displayed signals with respect to the radial scan of the time base.

FIGURE 3 indicates approximately the relief or three dimensional nature of the display obtained, five targets being indicated. In FIGURE 3 the boundary of the display is shown elliptical, the figure being drawn for the case where the Y component of deflection is adjusted to be less than the X component.

We claim:

1. A radar having a cathode ray display system of the P.P.I. type wherein angular movement of an echo-signal displaying cathode ray beam about the display origin is obtained by two angularly related components of deflection applied to said ray, said radar comprising means for superimposing upon at least one of said components an auxiliary signal which is constituted by or derived from the echo signals, whereby desired targets are displayed in a manner resembling that of a three-dimensional or relief picture.

2. A radar as claimed in claim 1 wherein said superimposed auxiliary signal is of a magnitude which is varied in dependence upon the varying magnitude of one of said angularly related components.

3. A radar as claimed in claim 1 wherein echo-signals are superimposed directly on one of the components of deflection.

4. A radar as claimed in claim 1 wherein the two angularly related components of deflections are mutually perpendicular.

5. A radar as claimed in claim 1 wherein the two angularly related components of deflection are of equal magnitudes.

6. A radar as claimed in claim 1 wherein the two angularly related components of deflection are of adjustable relative magnitude.

7. A radar as claimed in claim 1 wherein there is provided for at will manually rotating the display produced by the cathode ray tube.

8. A radar as claimed in claim 1 and comprising means for deriving, in correspondence with the changing direction of the transmitted radar beam, two deflection control signals dependent respectively upon the sine and cosine of the angle between said direction and a datum direction; a gain controllable amplifier to which video signals derived from the radar receiver are fed; means for controlling the gain of said amplifier by one of said deflection control signals; and means for superimposing gain controlled auxiliary signals derived from said amplifier on said one deflection control signal.

9. A radar as claimed in claim 8 wherein signals employed for controlling the intensity of the cathode ray beam in the display tube are derived from received echo signals by means including an amplifier which is controlled in gain by the aforesaid one of the two deflection control signals.

10. A radar having a cathode ray display system of the P.P.I. type wherein angular movement of an echo-signal displaying cathode ray beam about the display origin is obtained by two angularly related components of deflection applied to said ray, said radar comprising means for superimposing upon at least one of said components an auxiliary signal which is derived from the echo signals and is of a magnitude which is varied in dependence upon the varying magnitude of the component on which it is superimposed whereby desired targets are displayed in a manner resembling that of a three-dimensional or relief picture.

References Cited

UNITED STATES PATENTS 2,824,302   2/1958   Poor _____ 343—7.9 XR

RODNEY D. BENNETT, Jr., Primary Examiner

MALCOLM F. HUBLER, Assistant Examiner